United States Patent [19]

Noone et al.

[11] 4,111,572
[45] Sep. 5, 1978

[54] CERAMIC-METAL ASSEMBLY

[75] Inventors: Michael J. Noone, Wayne; Arno Gatti, Norristown, both of Pa.

[73] Assignee: General Electric Company, Fairfield, Conn.

[21] Appl. No.: 776,281

[22] Filed: Mar. 10, 1977

[51] Int. Cl.² .................................... F16B 11/00
[52] U.S. Cl. .................... 403/28; 403/267; 403/272; 228/124
[58] Field of Search ............ 403/272, 267, 404, 179, 403/29, 28, 380; 228/165, 122, 169, 120, 124, 135

[56] References Cited

U.S. PATENT DOCUMENTS

| 726,026 | 4/1903 | Canda | 228/165 |
|---|---|---|---|
| 2,163,409 | 6/1939 | Pulfrich | 403/272 X |
| 3,029,559 | 4/1962 | Treptow | 228/122 X |
| 3,171,519 | 3/1965 | Nolte | 403/179 |
| 3,302,961 | 2/1967 | Franklin | 403/272 |
| 3,862,488 | 1/1975 | Pessell et al. | 228/122 |

*Primary Examiner*—Andrew V. Kundrat
*Attorney, Agent, or Firm*—Allen E. Amgott; Raymond H. Quist

[57] ABSTRACT

Magnetohydrodynamic devices using hot ionized gas as working fluid require channel refractories, insulators, and electrodes to be cooled at their reverse sides in order to carry away heat flux fast enough to keep obverse sides below melting point, since gas temperatures of roughly 2500° C. exceed melting points of any available metals or ceramics. Common procedure of brazing ceramic to metal backing (which is more conveniently fastened in apparatus and cooled) creates only partially solvable problem of differential thermal expansion, or bad fit. Ceramic reverse is grooved with dovetailed or convergent slots against which brazing stock is placed for brazing to metal backing. During brazing, molten braze alloy enters grooves and forms mechanical lock which on test proves stronger than ceramic itself. Large expanses of ceramic may be grooved on obverse to insure that cracks resulting from thermal stress, especially thermal shock, will be regular and subdivide surface into smaller regular units which may still be used.

3 Claims, 4 Drawing Figures

CERAMIC-METAL ASSEMBLY

CROSS REFERENCE TO RELATED APPLICATIONS

COMPLIANT MHD ELECTRODE STRUCTURE, by Anthony P. Coppa and Bert Zauderer; and COMPLIANT MHD ELECTRODE SUPPORT, By Earl Feingold and Michael J. Noone; both applications filed in the Patent and Trademark Office on Feb. 14, 1977, Ser. Nos. 768,641 and 768,474 respectively, and both assigned to assignee of present application.

BACKGROUND OF THE INVENTION

1. Field of the Invention

This invention pertains to magnetohydrodynamic generators employing hot ionized gas as the working fluid, and more particularly to apparatus therefor.

2. Description of the Prior Art

Potsherds are prominent in prehistoric kitchen middens; art of such antiquity cannot be summarized briefly; undoubtedly, apart from glazes, there are many examples of attachment of ceramics to metal. However, in the restricted field of exposure to high temperature oxidizing and otherwise corrosive gas at high velocity, the primary prior art approach has been the brazing of ceramic to a metal backing. The referenced copending applications, commonly assigned, teach mounting of ceramics on flexible backing. No prior art known to the applicants teaches or suggests the present invention.

BRIEF SUMMARY OF THE INVENTION

The reverse side of a ceramic piece is slotted with at least two sets of slots, preferably orthogonal to each other, inclined so that they point toward the center of the obverse of the piece. A metal backing is then brazed to the slotted side of the ceramic with a sufficient thickness of brazing alloy to leave the slots filled with the alloy. As the piece cools down after brazing, the greater contraction of the metal braze alloy and backing will pull the ceramic in a direction which will tend to force the brazing alloy into the slots, thus producing a strong geometric mechanical bond in addition to the bond produced by the brazed joint. If a ceramic piece of a very large area is to be bonded, it may be desirable to consider it subdivided into a number of separate, preferably like, areas each of which is viewed along and provided on its reverse with slots directed toward its center. Since thermal shock, such as may occur if a gas flow at high temperature is turned suddenly on its face, may crack a ceramic piece independently of stress caused by a backing, it is desirable to provide slots on the front of the piece to promote its fracture into regularly shaped pieces with fairly regular edges which are unlikely to have residual entrant cracks.

DESCRIPTION OF THE PREFERRED EMBODIMENT

Figure 1:
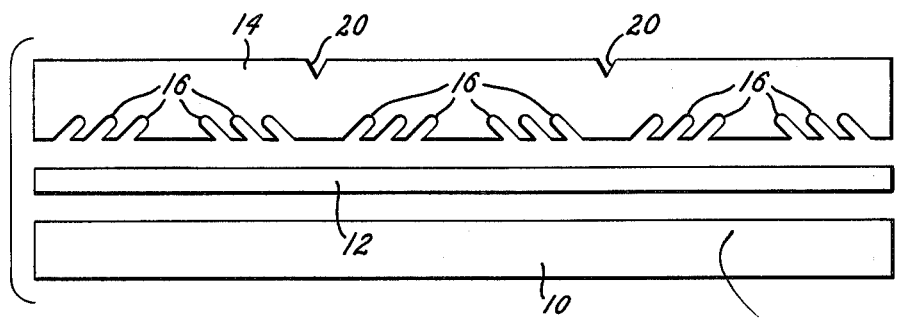
FIG. 1 represents slotted ceramic, brazing stock, and metal backing in position for the brazing operation.

FIG. 1 represents a metal backing 10, conveniently of nickel, below a brazing sheet of brazing alloy 12, above which is a ceramic piece 14 having slots 16 (and 18 in FIG. 2) on its reverse, and grooves 20 on its obverse.

Figure 2:
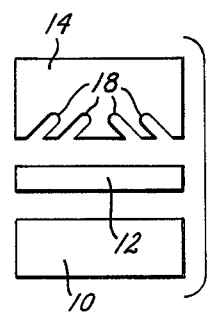
FIG. 2 represents a profile view of the same.

In a typical actual case, ceramic piece 14 was a spinal type body incorporating impurities to render it electrically conductive at high temperatures for use as an MHD electrode. It was 0.100 inches thick (2.54 mm) 3 inches (76.2 mm.) long and 0.375 inches (9.38 mm.) wide. Slots 16 were cut with a diamond cutting wheel 10 to 15 inch mils (thousandths of an inch) thick having a rounded edge in order that it might produce slots not having sharp corners (since sharp corners are objectionable as causing concentrations of stress). The slots 16 were cut at an angle of 30° to 45° to the horizontal face of 14, to a depth of about 10 to 20 inch mils. Grooves 20 were cut similarly, with a diamond cutting wheel having a sharp edge since it was desired that they serve to localize stress; they were spaced one inch from each end of 14, to promote its division into one-inch long pieces if thermal shock caused it to separate. Eighteen slots 16 were cut as represented, with three slots facing upward to the left, then three slots facing upward to the right, and so continuing alternately to reproduce three paired sets of three slots 16 each. This provided each one-inch section defined by grooves 20 with six slots 16 facing to the center of the section, so that the locking action would continue even after the three sections had actually been separated by cracking along the lines determined by grooves 20. FIG. 2 represents slots 18, two facing upward to the left and two facing upward to the right. Since the piece was only 0.375 inches wide, there was no occasion for providing grooves analogous to 20 to localize shock fractures over the narrow dimension.

Figure 3:
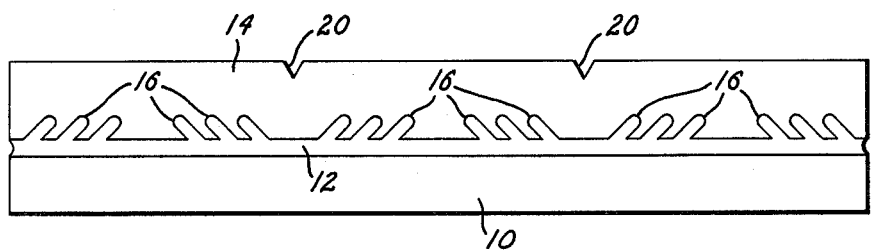
FIG. 3 represents the entities of FIG. 1 brazed together, with the slots filled with brazing alloy, and FIG. 4 a profile view of the same.
Figure 4:
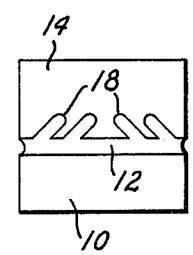

After the cutting of slots 16 and 18 and grooves 20, the reverse or slotted side of 14 was painted with a finely ball-milled water suspension of a mixture of manganese and molybdenum which was fired on to metallize the surface and prepare it for brazing, in accordance with the known art. Slotted metallized ceramic 14 was then brazed to backing 10 by interposing brazing alloy sheet 12 between backing 10 and the metallized face of 14 and firing the combination at a usual brazing temperature. Brazing alloy 12 melted and filled the slots 16 and 18, producing a result represented in FIGS. 3 and 4. This was the desired product.

In an early test, on a similar structure, the nine left-hand slots 16 were all cut pointing upward to the right, and the remaining nine right-hand slots 16 were cut pointing upward to the left, so that after the fracture along grooves 20 the end section of 14 were not locked by opposingly directed brazing alloy 12 in the slots 16. The mechanical adhesion of brazing alloy to the ceramically rough sides of slots 16 did produce sufficient adherence to keep the unit intact; but the intended use of the structure in a very rapidly moving stream of very hot and corrosive gas is so severe that this is not a desirable mode of procedure; it is not our preference although it did function in the inadvertent test of the matter.

Since ceramics may be formed with various internal apertures by casting, other methods are clearly available to produce grooved and slotted ceramics 14. In particular, dove-tailed slots might be produced instead of the straight-sided slots 16 and 18. These would have no left-or right-hand orientation and to that extent would simplify the design. However, they would reduce somewhat the cross section of ceramic at the joint, and may be undesirable for that reason. Also, pressing simple rectangular pieces of ceramic body is much simpler than casting particularly when a high-density ceramic product is desired.

Generically, the invention disclosed may be described as comprising a ceramic piece brazed to a metal backing by a braze alloy, in which oppositely directly slots in the brazed face of the ceramic piece are filled with the braze alloy. The grooves in the exposed face of the ceramic are provided to localize fractures occurring in the exposed face of the ceramic from the application of heat to it.

What is claimed:

1. In a structure comprising a metallized ceramic piece brazed to a metal backing by a braze alloy, the improvement comprising:
   oppositely directed slots in the brazed face of the ceramic piece which are filled with the said braze alloy and the orientation of said slots are such that upon cooling of the ceramic piece the contraction of the braze alloy and backing pulls the ceramic in a direction which tends to force the braze alloy into the slots, thereby producing a mechanical bond in addition to the bond produced by the brazed joint.

2. The improvement claimed in claim 1 further comprising:
   oppositely directed slots, orthogonal to the therein said oppositely directed slots, which are also filled with the said braze alloy.

3. The improvement claimed in claim 1 in which the exposed face of the ceramic is provided with grooves to localize fractures occurring in the said exposed face from the application of heat to the said exposed face.

* * * * *